US008458590B2

(12) United States Patent  (10) Patent No.: US 8,458,590 B2
Yajima  (45) Date of Patent: Jun. 4, 2013

(54) COMPUTER READABLE MEDIUM FOR CREATING DATA, DATA CREATING APPARATUS, PRINTING APPARATUS AND PRINTING SYSTEM

(75) Inventor: Masahiko Yajima, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 440 days.

(21) Appl. No.: 12/544,542

(22) Filed: Aug. 20, 2009

(65) Prior Publication Data

US 2010/0199175 A1    Aug. 5, 2010

(30) Foreign Application Priority Data

Feb. 2, 2009   (JP) ................................ 2009-021383

(51) Int. Cl.
*G06F 17/00*    (2006.01)
(52) U.S. Cl.
USPC ........................................................ 715/274
(58) Field of Classification Search
USPC .................................. 715/255, 273, 274, 277
See application file for complete search history.

(56) References Cited

U.S. PATENT DOCUMENTS

| | | | | |
|---|---|---|---|---|
| 4,845,656 A | * | 7/1989 | Nishibe et al. ................. | 345/562 |
| 5,684,969 A | * | 11/1997 | Ishida ............................ | 715/800 |
| 5,974,391 A | * | 10/1999 | Hongawa ...................... | 705/7.26 |
| 6,282,514 B1 | | 8/2001 | Kumashiro | |
| 7,684,064 B2 | * | 3/2010 | Kimura et al. ................ | 358/1.14 |
| 7,809,807 B2 | * | 10/2010 | Tominaga ...................... | 709/220 |
| 7,826,103 B2 | * | 11/2010 | Kayama ........................ | 358/452 |
| 2004/0150853 A1 | * | 8/2004 | Stodersching et al. ....... | 358/1.13 |
| 2005/0105129 A1 | * | 5/2005 | Takahashi ..................... | 358/1.15 |
| 2005/0206941 A1 | * | 9/2005 | Shima .......................... | 358/1.13 |
| 2005/0278619 A1 | * | 12/2005 | Kim et al. ..................... | 715/513 |
| 2005/0280837 A1 | | 12/2005 | Ono et al. | |
| 2005/0280855 A1 | * | 12/2005 | Ono et al. .................... | 358/1.13 |
| 2006/0061792 A1 | * | 3/2006 | Kim et al. ..................... | 358/1.13 |
| 2007/0223025 A1 | | 9/2007 | Hashizume | |
| 2008/0168542 A1 | * | 7/2008 | Sato ................................ | 726/5 |

FOREIGN PATENT DOCUMENTS

| | | |
|---|---|---|
| JP | 2006-4183 A | 1/2006 |
| JP | 2007-164224 A | 6/2007 |
| JP | 2007-253598 A | 10/2007 |

OTHER PUBLICATIONS

Japanese Office Action, dated Feb. 12, 2013, issued by the Japanese Patent Office in counterpart Japanese Application No. 2009-021383.
Office Action, dated Mar. 25, 2013, issued by the State Intellectual Property Office of P.R. China in counterpart Chinese Patent Application No. 200910174398.X.

* cited by examiner

*Primary Examiner* — Laurie Ries
(74) *Attorney, Agent, or Firm* — Sughrue Mion, PLLC

(57) ABSTRACT

A computer readable medium storing a program causing a computer to execute a process for creating a data, the process includes: receiving first data described in a print language format for printing; converting a part of the first data, which corresponds to an electronic document format for display, received in the receiving into second data described in the electronic document format; and adding third data, which does not correspond to the electronic document format, of the first data received in the receiving to the second data.

10 Claims, 13 Drawing Sheets

FIG. 5

411: CONVERSION DESTINATION TABLE

| ITEM | PRINT-NON-OBJECT DATA REGION | | | |
|---|---|---|---|---|
| | GUIDE | ANNOTATION | COMMENT | PDF MARK |
| BINDING MARGIN | | ○ | | |
| SHEET TRAY | | | ○ | |
| EXTERNAL TRAY USE OF REPORT SHEET | | | ○ | |
| DOUBLE SIDE/SINGLE SIDE PRINT | | | ○ | |
| OUTPUT SIDE DIRECTION | ○ | | | |
| ADAPT | ○ | ○ | | |
| NUMBER OF COPIES | | | | |
| OUTPUT OFFSET | | | | ○ |
| JOB ID | | ○ | | |
| USER ID | | | | |
| DEFAULT | ○ | | | |

FIG. 6

412: FORM TABLE

| ITEM | FORM | ITEM VALUE |
|---|---|---|
| BINDING MARGIN | BINDING = 'BD = %s' | S(SHORT SIDE)/L(LONG SIDE) |
| SHEET TRAY | FEED = 'FD = %s' | MAIN/AUX/SUB/EXTEND |
| EXTERNAL TRAY USE OF REPORT SHEET | COVER = 'CV = %s' | Y(DO)/N(DON'T) |
| DOUBLE SIDE/SINGLE SIDE PRINT | DUPLEX = 'DP = %s' | DO(DOUBLE SIDE)/SIMP(SINGLE SIDE) |
| OUTPUT SIDE DIRECTION | FACEUP = 'FU = %s' | UP/DN |
| ADAPT | COLLATE = 'CL = %s' | Y(DO)/N(DON'T) |
| NUMBER OF COPIES | COPY = 'CP = %s' | NUMERICAL VALUE |
| OUTPUT OFFSET | OFFSET = 'OF = %s' | Y(DO)/N(DON'T) |
| JOB ID | JOBID = 'JID = %s' | CHARACTER STRING OF JOB ID |
| USER ID | USERID = 'UJD = %s' | CHARACTER STRING OF USER ID |

COMPUTER READABLE MEDIUM FOR CREATING DATA, DATA CREATING APPARATUS, PRINTING APPARATUS AND PRINTING SYSTEM

CROSS-REFERENCE TO RELATED APPLICATION

This application is based on and claims priority under 35 USC 119 from Japanese Patent Application No. 2009-021383 filed on Feb. 2, 2009.

BACKGROUND

1. Technical Field

The present invention relates to a data creating program, a data creating apparatus, a printing apparatus and a printing system.

2. Background Art

In the related art, an information processing apparatus, such as a personal computer or a host computer, sends print data of a print language format, which can be interpreted by a printing apparatus, which is connected thereto via a network link, to the printing apparatus, and the printing apparatus converts the print data of the print language format, which has been received from the information processing apparatus, into print data of a bitmap format and performs a printing operation based on the print data of the bitmap format.

SUMMARY

According to an aspect of the invention, a computer readable medium storing a program causing a computer to execute a process for creating a data, the process includes: receiving first data described in a print language format for printing; converting a part of the first data, which corresponds to an electronic document format for display, received in the receiving into second data described in the electronic document format; and adding third data, which does not correspond to the electronic document format, of the first data received in the receiving to the second data.

BRIEF DESCRIPTION OF THE DRAWINGS

Exemplary embodiments of the invention will be described in detail based on the following figures, wherein:

FIG. 5 is a view showing an example of a conversion destination table;

FIG. 6 is a view showing an example of a form table;

DETAILED DESCRIPTION

A data creating apparatus according to this exemplary embodiment includes a receiving unit for receiving first data described in a print language format used for printing, an analyzing unit for analyzing the first data received by the receiving unit, a converting unit for converting data, which corresponds to an electronic document format used for display, of the first data analyzed by the analyzing unit into second data described in the electronic document format, and an adding unit for adding data, which does not correspond to the electronic document format, of the first data received by the receiving unit to the second data.

The term "print language format" used herein refers to a data format which is used for printing and can be analyzed by a printing unit. Examples of the print language format may include a post script (PS) of a page description language, a line conditioned data stream (LCDS) of a print data format, an intelligent printer data stream (IPDS) or other kinds of print languages proposed by companies which make printing unit. In addition, although a PDF document format or the like may be rarely used as a format for printing, a data format used for printing other than a format used for display is here defined as the print language format.

The term "electronic document format" used herein refers to a data format which is used for display and can be analyzed by a displaying unit for displaying data or information on a display screen. Examples of the electronic document format may include a portable document format (PDF) document, a word processor document (for example, Microsoft Office Word), an excel database document (for example, Microsoft Office Excel), etc. which are analyzed and displayed on a display screen by their own applications.

In the above configuration, when the first data described according to the print language format is received, data corresponding to the electronic document format of the first data is converted into the electronic document format and is generated as second data, while data, which does not correspond to the electronic document format, is added to the second data. Accordingly, when the data, which does not correspond to the electronic document format, is converted into the electronic document data format, since the data is not lost from the second data, data reversibility between the first data and the second data can be established when the electronic document data are printed, displayed, stored and soon.

First Exemplary Embodiment

Figure 1:
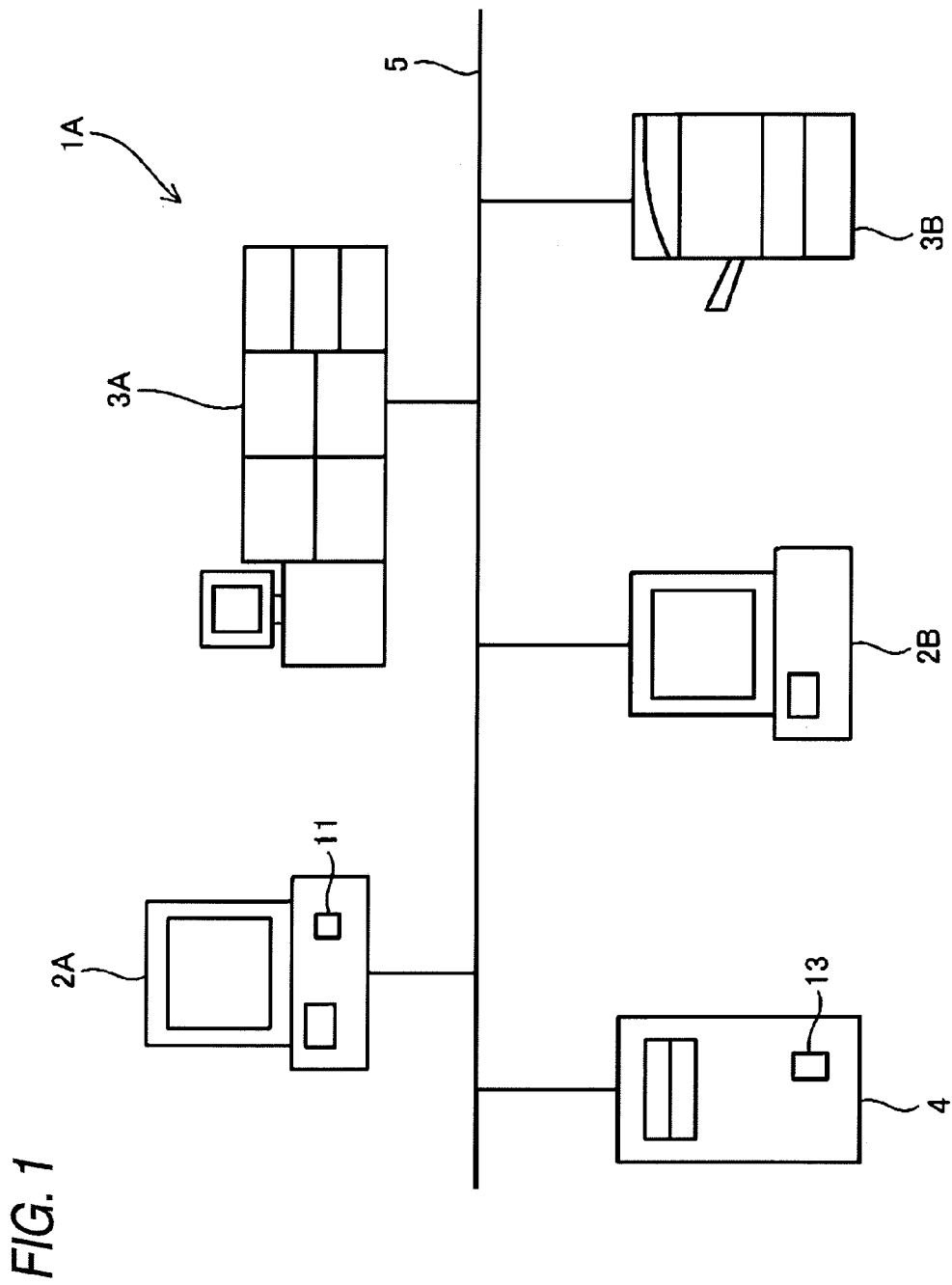
FIG. 1 is a general view showing an example of a general configuration of a printing system according to a first exemplary embodiment of the present invention.

FIG. 1 is a general view showing an example of a general configuration of a printing system according to a first exemplary embodiment of the present invention. A printing system 1A includes a first terminal 2A which receives a print instruction to print form data 11 and generates a print job 12, a private printer 3A which performs a printing process based on the print job 12, a data creating apparatus 4 which converts the print job 12 and creates document data 13, a second terminal 2B which performs operations such as display, editing, printing and so on for the document data 13, a public printer 3B which performs a printing process based on the document data 13, and a network 5 which interconnects the first and second terminals 2A and 2B, the private printer 3A, the public printer 3B and the data creating apparatus 4.

Here, the print job 12 is used as an example of data of the print language format of the present invention and the document data 13 is used as an example of data of the electronic document format of the present invention.

In addition, although it is shown in FIG. 1 that the printing system 1A includes only one first terminal 2A, one second terminal 2B, one private printer 3A and one public printer 3B, this system may include plural of first terminals 2A, second terminals 2B, private printers 3A and public printers 3B.

(Network)

The network 5 may include a communication network such as a local area network (LAN) which performs data communication using wired communications (electrical cable, optical cables, etc.), radio communications (electrical wave, infrared, etc.), or the like.

(Apparatus Configuration)

Figure 2:
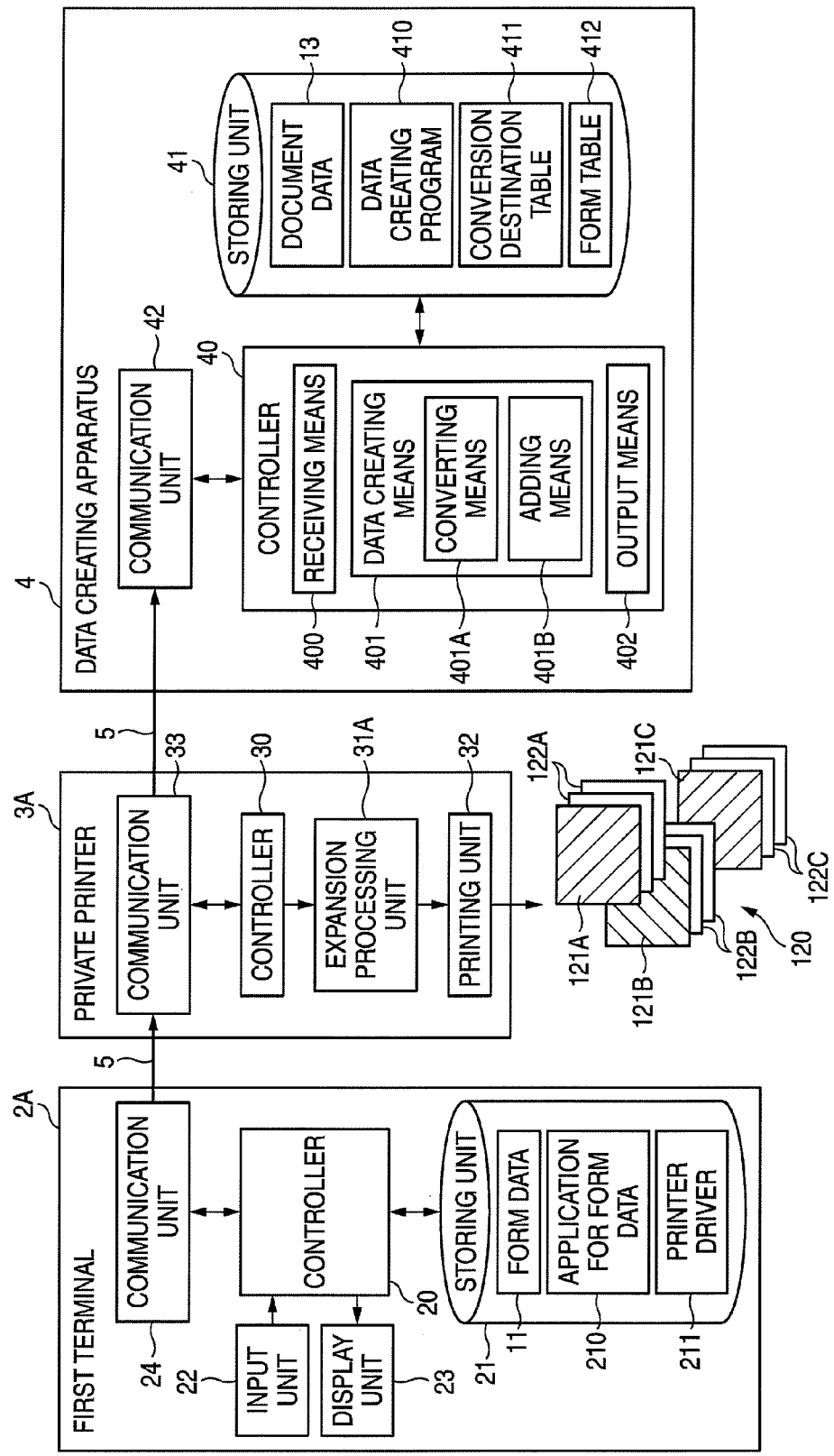
FIG. 2 is a block diagram showing an example of a general configuration of a first terminal, a data creating apparatus and a private printer.

FIG. 2 is a block diagram showing an example of a general configuration of the first terminal, the data creating apparatus and the private printer.

(First Terminal)

The first terminal 2A includes a controller 20 which controls various parts of the first terminal 2A and is implemented by, for example, a CPU or the like, a storing unit 21 which stores various kinds of programs and data and is implemented by, for example, ROM, RAM, a hard disk or the like, an input unit 22 which receives a manipulation of data input and is implemented by, for example, a keyboard, a mouse or the like, a display unit 23 which displays various kinds of screens and is implemented by, for example, a liquid crystal display or the like, and a communication unit 24 which is connected to the network 5 and is implemented by, for example, a network interface card or the like.

Such a first terminal 2A is configured by an information processing apparatus such as, for example, a computer, a personal digital assistant (PDA), a mobile phone or the like.

The storing unit 21 stores an application for form data 210, a printer driver 211 and so on in addition to the form data 11. The application for form data 210 is an application such as, for example, a word processor, a table calculation, accounts, production management or the like. The form data 11 uses a data format displayed on the display unit 23 of the first terminal 2A, such as, for example, data of a PDF format, data of a word document format, data of an excel document format or the like.

The controller 20 operates according to the application for form data 210 to display the form data 11 on the display screen of the display unit 23 and to update the form data 11 on the display screen based on the contents input through the input unit 22.

In addition, the controller 20 operates according to the printer driver 211 to receive a print instruction for the form data 11 along with print control information as print conditions and to generate job management information. Further, the controller 20 generates the form data 11 as the print job 12 described with the page description language based on the print control information and the job management information of the form data 11 and transmits the print job 12 to the data creating apparatus 4. Details of the print control information and the job management information will be described later.

(Private Printer)

The private printer 3A includes a controller 30 which controls various parts of the private printer 3A and is implemented by, for example, a CPU or the like, an expansion processing unit 31A which analyzes the print job 12 transmitted from the first terminal 2A and expands (rasterizes) the analyzed print job 12 as image data such as, for example, a bitmap or the like based on a result of the analysis, a printing unit (first printing unit) 32 which forms a visible image based on the image data on a recording medium such as a print sheet or the like and outputs prints 120 according to the print control information, and a communication unit 33 which is connected to the network 5 and is implemented by, for example, a network interface card or the like. The private printer 3A is only by way of example of this exemplary embodiment and may be used as a public printer.

For example, the prints 120 output from the printing unit 32 may include print sheets 122A to 122C on which visible images based on the image data are printed, and report sheets 121A to 121C interposed thereamong for sorting these print sheets to 3 distribution destinations, respectively. That is, of the print sheets 122A to 122C, the print sheets 122A between the report sheet 121A and the report sheet 121B are distributed to a distribution destination A, the print sheets 122B between the report sheet 121B and the report sheet 121C are distributed to a distribution destination B, and the print sheets 122C positioned in the rear side of the report sheet 121C are distributed to a distribution destination C. In addition, the report sheets 121A to 121C and the print sheets 122A to 122C are offset-output with different offsets in the unit of distribution destination.

(Data Creating Apparatus)

The data creating apparatus 4 includes a controller 40 which controls various parts of the data creating apparatus 4 and is implemented by, for example, a CPU or the like, a storing unit 41 which stores various kinds of programs and data and is implemented by, for example, ROM, RAM, a hard disk or the like, and a communication unit 42 which is connected to the network 5 for data communication and is implemented by, for example, a network interface card or the like.

Such a data creating apparatus 4 is configured by, for example, a computer, a server, a workstation (WS) or the like.

The storing unit 41 stores a data creating program 410, a conversion destination table 411 and a form table 412 and so on in addition to the document data 13. Details of the conversion destination table 411 and the form table 412 will be described later. In addition, the data creating program 410 may be provided by an information storage medium such as a hard disk, CD-ROM or the like and may be provided via a data communication network such as Internet or the like.

The controller 40 functions as a receiving unit 400, a data creating unit 401, an output unit 402 and the like by operating according to the data creating program 410. The receiving unit 400 is used as an example of the receiving unit of the present invention.

The receiving unit 400 receives the print job 12, in which the form data 11 and the print control information are described as records according to the page description language, from the private printer 3A. In addition, the receiving unit 400 may receive the print job 12 from the first terminal 2A.

The data creating unit 401 is configured by a converting unit 401A for analyzing the print job 12 and converting records, which correspond to a PDF format, of records included in the print job 12 into the PDF format, and an adding unit 401B for adding records, which do not correspond to the PDF format, to the print job 12, with a page description language format, based on the conversion destination table 411 and the form table 412. The document data 13 are created by the converting unit 401A and the adding unit 401B. The converting unit 401A is used as an example of the converting unit of the present invention and the adding unit 401B is used as an example of the adding unit of the present invention.

The output unit 402 receives a print request for the document data 13, generates output data based on the document data 13, and transmits the output data to the public printer 3B. Examples of the print request may include data specifying information, such as file name and the like, which specifies the document data 13, printer specifying information, such as a printer name and the like, which represents a printer of an output destination, etc. In addition, if the printer of the output destination is a printer capable of directly analyzing a document of a PDF format, the output data may be transmitted without being created.

(Second Terminal)

Figure 3A:
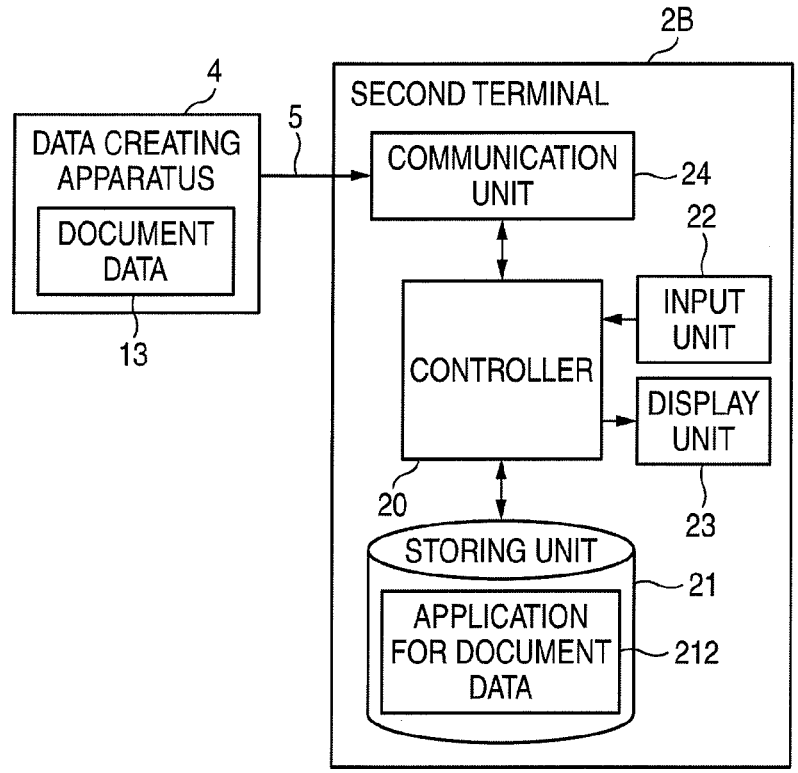
FIG. 3A is a block diagram showing an example of a general configuration of a second terminal.

FIG. 3A is a block diagram showing an example of a general configuration of the second terminal. The second terminal 2B is configured by an information processing apparatus, like the first terminal 2A, and includes a controller 20, a storing unit 21, an input unit 22, a display unit 23 and a communication unit 24. The storing unit 21 stores an application for document data 212.

The controller 20 displays the document data 13 on the display unit 23 by operating according to the application for document data 212. By displaying the document data 13 on the display unit 23, the document data 13 can be recognized by a user. Upon receiving a print instruction for the document data 13 on a display screen of the display unit 23 through the input unit 22, the controller 20 transmits a print request for the document data 13 to the data creating apparatus 4.

(Public Printer)

Figure 3B:
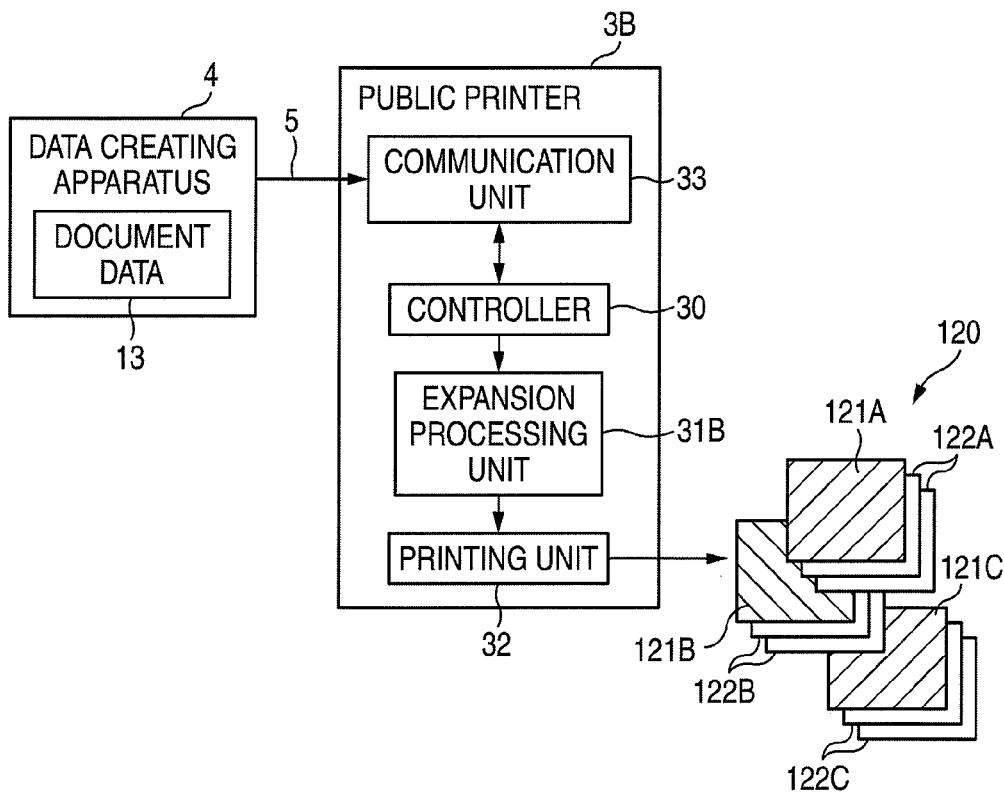
FIG. 3B is a block diagram showing an example of a general configuration of a public printer.

FIG. 3B is a block diagram showing an example of a general configuration of the public printer. The public printer 3B includes an expansion processing unit 31B which analyzes the output data output from the data creating apparatus 4 and expands the analyzed output data as image data based on a result of the analysis, in addition to the same controller 30, printing unit 32 (second printing unit) and communication unit 33 as in the private printer 3A.

(Data Structure)

Figure 4:
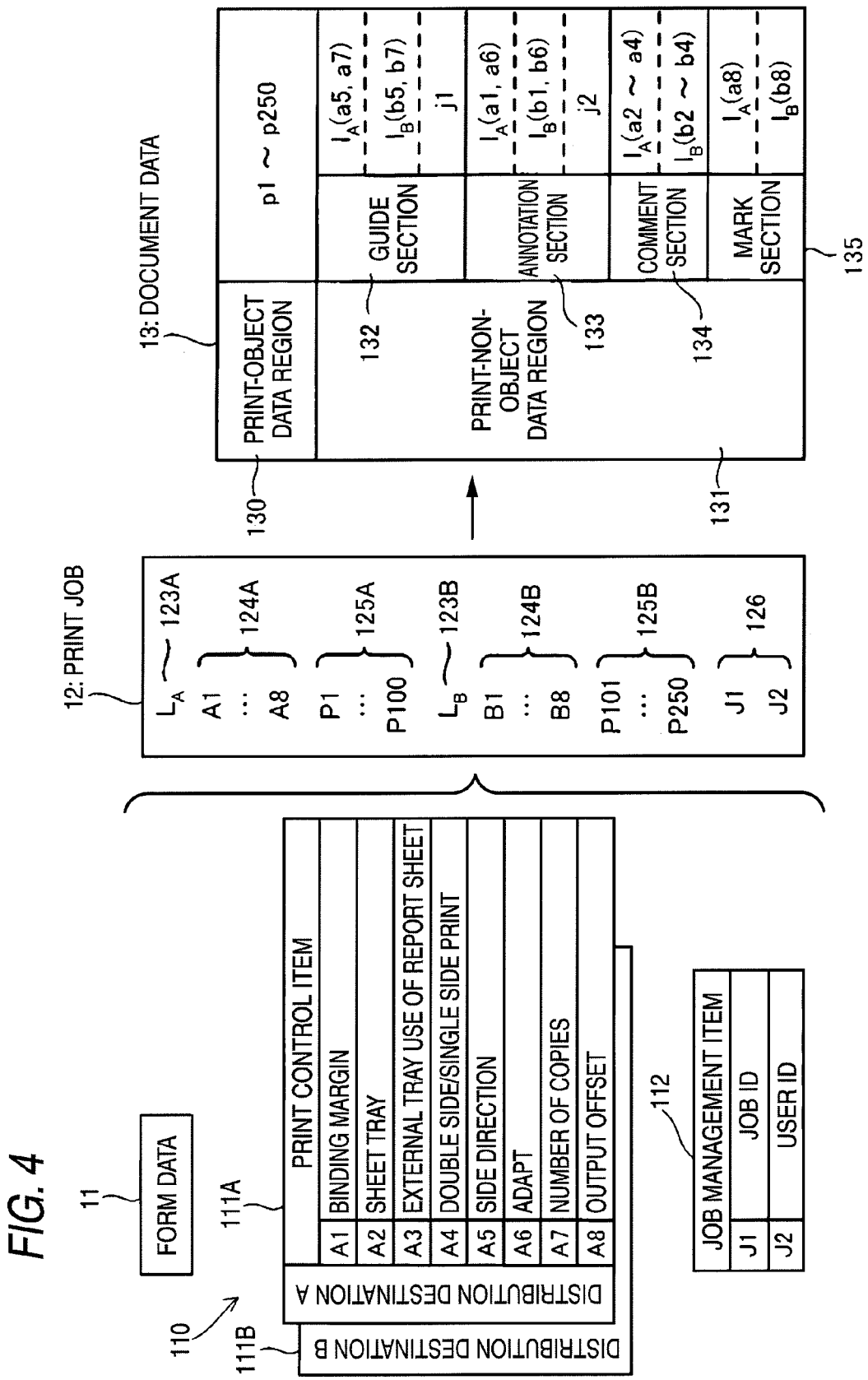
FIG. 4 is a view showing an example of a data structure of form data, print control information, print job and document data.

FIG. 4 is a view showing an example of a data structure of the form data, the print control information, the print job and the document data.

(Form Data)

The form data 11 is print-object data created by the application for form data 210 of the first terminal 2A. The form data 11 includes, for example, documents, photographs, charts and so on and may be variable print data.

Print control information 110 is information which records print conditions when the form data 11 is printed. In case where the prints 120 based on the form data 11 are distributed to, for example, 2 distribution destinations A and B, respectively, the print control information 110 includes first print control information 111A and second print control information 111B to specify print conditions for the respective distribution destinations A and B. The first and second print control information 111A and 111B are used as examples of data which do not correspond to an electronic document format.

Each of the first and second print control information 111A and 111B has plural of print control items, for each of which an item value is specified. Examples of the print control items may include "Binding margin" to designate a binding position, "Sheet tray" to designate a sheet tray used in printing, "External tray use" to designate use or not of an external tray in printing of a report sheet, "Double side/single side print" to designate double side printing or single side printing, "Output side direction" to designate which output side printed with a visible image is to be output, a front side or a rear side, "Adapt" (bookbinding) to designate whether or not to adapt, "Number of copies" to designate the number of copies, "Output offset" to designate whether or not to offset prints by a separating unit.

In addition, each of the first and second print control information 111A and 111B includes information indicating the insertion of a report sheet, for example, paragraph information to designate a distribution destination name of a distribution destination and the like.

Job management information 112 is information generated when there is a print instruction for the form data 11. The job management information 112 has plural of job management items, for each of which an item value is specified. Examples of the job management items may include "Job ID" to specify a print job, including a name, a number, or a combination thereof, "User ID" to specify a user who issues a print instruction, etc.

(Print Job)

The print job 12 is described in a page description language which can be analyzed by the private printer 3A. The print job 12 is data generated by the printer driver 211 of the first terminal 2A based on the above-mentioned form data 11, print control information 110 and job management information 112.

The print job 12 includes print-object records P1 to P250 based on the form data 11, a first paragraph record LA and print control records A1 to A8 based on the first print control information 111A, a second paragraph record LB and print control records B1 to B8 based on the second print control information 111B, job management records J1 and J2 based on the job management information 112, etc.

The print-object records P1 to P250 are records described corresponding to each page of the form data 11. The paragraph records LA and LB are records to describe paragraph information. The print control records A1 to A8 are records to describe item values of each print control item for the distribution destination A. The print control records B1 to B8 are records to describe item values of each print control item for the distribution destination B.

Although the example of FIG. 4 shows the order of the first paragraph record (LA) 123A, the print control records (A1 to A8) 124A, the print-object records (P1 to P100) 125A, the second paragraph record (LB) 123B, the print control records (B1 to B8) 124B, the print-object records (P101 to P250) 125B, and the job records (J1 and J2) 126, the recording order of records is not limited thereto.

(Document Data)

The document data 13 is data of an electronic document format generated to confirm display contents of the form data 11 or conserve the form data 11 as a general-purpose document. In addition, the document data 13 is data created by the data creating unit 401 of the data creating apparatus 4, which can be instructed to be displayed, edited and printed by the application for document data 212 of the second terminal 2B. Although it is shown in this exemplary embodiment that the document data 13 is in PDF format, this data may have an independent format without any limitation.

The document data 13 has a print-object data region 130 and a print-non-object data region 131. The print-object data region 130 is a data region to record data for a print object to be printed on the prints 120 as a visible image, which is also to be a display object displayed on the display screen. The print-non-object data region 131 is a data region to record data for a display object but which is not to be a print object.

In the print-object data region 130 are recorded print-object data p1 to p250 of a PDF format into which the print-object records P1 to P250 are converted.

The print-non-object data region 131 is divided into plural of sections, including a guide zone 132, an annotation zone 133, a comment zone 134, a mark zone 135, etc.

In the print-non-object data region 131 are recorded paragraph information 1A and 1B, print control information a1 to a8 and b1 to b8 and job management information j1 and j2 into which the paragraph records LA and LB, the print control records A1 to A8 and B1 to B8 and the job management records J1 and J2 are respectively converted based on the conversion destination table 411 and the form table 412.

The print control information a1 to a8 and b1 to b8 is in a state enabling the distribution destinations to be distinguished, that is, associated with the paragraph information, and is recorded in the print-non-object data region 131. In addition, the job management data j1 and j2 are recorded without distinguishing between distribution destinations. In addition, the data region in which the print control information a1 to a8 and b1 to b8 and the job management data j1 and j2 are recorded is selected by the data creating unit 401 based on the conversion destination table 411. In addition, the formats of the print control information a1 to a8 and b1 to b8 and the job management data j1 and j2 are recorded according to the form table 412.

(Conversion Destination Table)

FIG. 5 is a view showing an example of the conversion destination table. The conversion destination table 411 stored in the data creating apparatus 4 is a table to specify in which of the guide section 132, the annotation section 133, the comment section 134 and the mark section 135 of the print-non-object data region 131 of the document data 13, the print control information and the job management information are to be recorded, depending on the kind of item of the print control information and the job management information. Alternatively, the print control information and the job management information may be fixedly recorded in a predetermined section irrespective of the kind of item of the print control information and the job management information.

In the conversion destination table 411, a data region of a conversion destination is designated for each item of the print control information and the job management information. In the example of FIG. 5, a mark "O" indicates a data region of a conversion destination. Items having no designated conversion destination, that is, having no "O" mark, are recorded in data regions corresponding to default regions. For example, for a item "Binding margin," since "O" is marked in a section "annotation," the data creating unit 401 decides that the print control information related to the item "Binding margin" should be recorded in the annotation section 133.

(Form Table)

FIG. 6 is a view showing an example of the form table. The form table 412 stored in the data creating apparatus 4 is a table defining a form when the print control information and the job management information are recorded in the print-non-object data region 131.

In the form table 412, the form when the print control information and the job management information are recorded in a data region of a conversion destination and an item value representing a parameter which can be taken for a corresponding item is defined for each item of the print control information and the job management information. For example, if an item value "short side" is designated for a print control item "Binding margin," the data creating unit 401 generates a character string "BD=S" and records the generated character string in the annotation section 133 determined by the conversion destination table 411.

Operation of First Exemplary Embodiment

Next, an example of the operation of the printing system 1A according to the first exemplary embodiment of the present invention will be described with reference to FIGS. 7 to 11.

(1) Generating Process and Printing Process of Print Job

Figure 7:
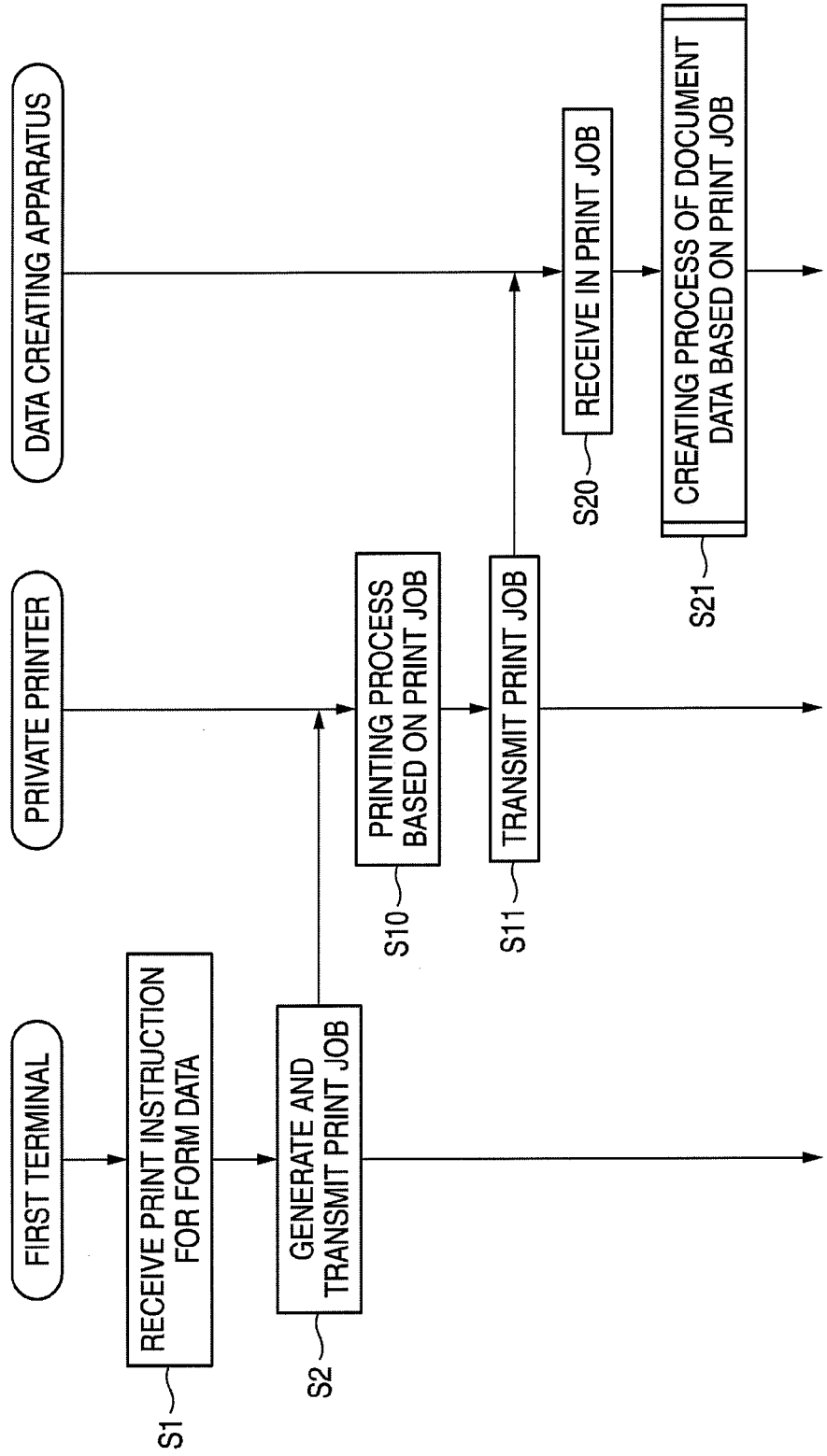
FIG. 7 is a flow chart showing an example of an operation of a generating process and a printing process of a print job.

FIG. 7 is a flow chart showing an example of an operation of a generating process and a printing process of a print job. The controller 20 of the first terminal 2A starts the application for form data 210 according to manipulation by the user and displays an input screen, through which print control information, for example, for the form data 11 is input, on the display unit 23. Then, as the user inputs the print control information through the input screen, the controller 20 receives a print instruction for the form data 11 (S1).

Next, upon receiving the print instruction, the controller 20 starts the printer driver 211 and generates job management information including a user ID to identify the user who issued the print instruction, a job ID which is newly issued, etc. Then, the controller 20 generates the print job 12 based on the form data 11, the print control information and the job management information. Then, the controller 20 transmits the generated print job 12 to the private printer 3A via the communication unit 24 (S2).

Next, upon receiving the print job 12 via the communication unit 33, the controller 30 of the private printer 3A causes the expansion processing unit 31A and the printing unit 32 to perform a print process based on the print job 12 (S10).

Specifically, the expansion processing unit 31A analyzes the print job 12 and acquires the contents of the print-object records, paragraph records and print control records included in the print job 12. Then, the expansion processing unit 31A performs an expansion process for the print-object records and generates image data such as, for example, bitmap data or the like. Then, the printing unit 32 acquires paragraph information and print control information from the print control records and the paragraph records, prints the image data on a recording medium such as a print sheet or the like according to the print control information and the paragraph information, and outputs prints 120.

Next, the controller 30 transmits the received print job 12 to the data creating apparatus 4 via the communication unit 33 (S11). In addition, the controller 30 may transmit the print job 12 to the data creating apparatus 4 before performing the printing process. In addition, the first terminal 2A may transmit the print job 12 to both the private printer 3A and the data creating apparatus 4.

(2) Generating Process from Print Job to Document Data

When the receiving unit 400 of the data creating apparatus 4 receives the print job 12 from the private printer 3A via the communication unit 42 (S20 in FIG. 7), the data creating unit 401 performs a document data creating process to create the document data 13 from the print job 12 (S21). Hereinafter, the details of the step S21 will be described with reference to FIG. 8. The step S20 is used as an example of the receiving step of the present invention.

Figure 8:
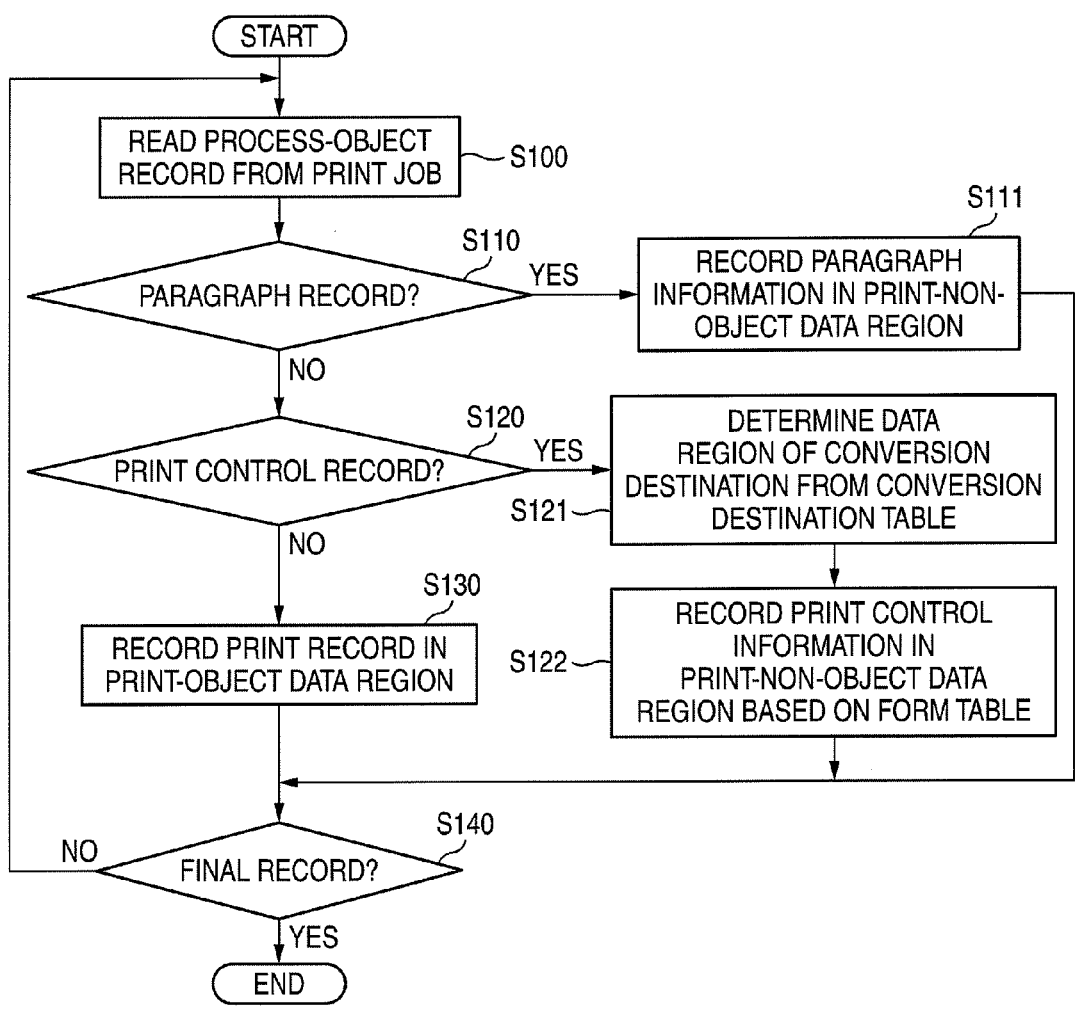
FIG. 8 is a flow chart showing an example of an operation of a creating process of document data.

FIG. 8 is a flow chart showing an example of an operation of the document data creating process. First, the data creating unit 401 selects one of plural of records recorded in the print job 12 in the recording order of the records, for example, and reads the selected record as a process-object record in order to process the plurality of records in the record unit (S100).

Next, the data creating unit 401 determines whether or nor the process-object record is a paragraph record (S110).

If it is determined that the process-object record is a paragraph record (Yes in S110), the data creating unit 401 acquires paragraph information as the contents of the paragraph record and records the acquired paragraph information in the print-non-object data region 131 (S111).

Then, the data creating unit 401 determines whether or nor the process-object record is the final record (S140). If it is determined that the process-object record is not the final record (No in S140), the data creating unit 401 returns to the step S100 where it reads the record, which is recorded next to the current process object record, as another process-object record (S100). On the other hand, if it is determined that the process-object record is the final record (Yes in S140), the data creating unit 401 terminates the document data creating process.

On the other hand, if it is determined in the step S110 that the process-object record is not a paragraph record (No in S110), the data creating unit 401 determines whether or not the process-object record is a print control record (S120).

If it is determined that the process-object record is a print control record (Yes in S120), the data creating unit 401 acquires print control information including print control items and item values as the contents of the print control record. Then, the data creating unit 401 determines a conversion destination for a print control item of the acquired print control information (S121) by making reference to the conversion destination table 411.

Next, the data creating unit 401 makes reference to a form corresponding to the print control item in the form table 412 and generates a character string describing the print control item and an item value according to the form. Then, the adding unit 401B adds the generated character string to the data region determined as the conversion destination in the step S121 in association with the paragraph information acquired in the step S111 (S122). Then, the data creating unit 401 proceeds to the determination process of the final record in the step S140. The step S122 is used as an example of the adding step of the present invention.

On the other hand, if the data creating unit 401 determines in the step S120 that the process-object record is not a print control record (No in S120), since the process-object record is a print-object record based on the form data 11, the converting unit 401A converts the print-object record into print-object data of a PDF format and records the print-object data in the print-object data region 130 (S130). The step S130 is used as an example of the converting step of the present invention.

Then, the data creating unit 401 proceeds to the determination process of the final record in the step S140.

In this manner, the data creating unit 401 processes all the records recorded in the print job 12, creates the document data 13 by recording records in the corresponding data regions of the document data 13 depending on the kind of record, and stores the created document data 13 in the storing unit 41.

(3) Displaying Process of Document Data

Figure 10:
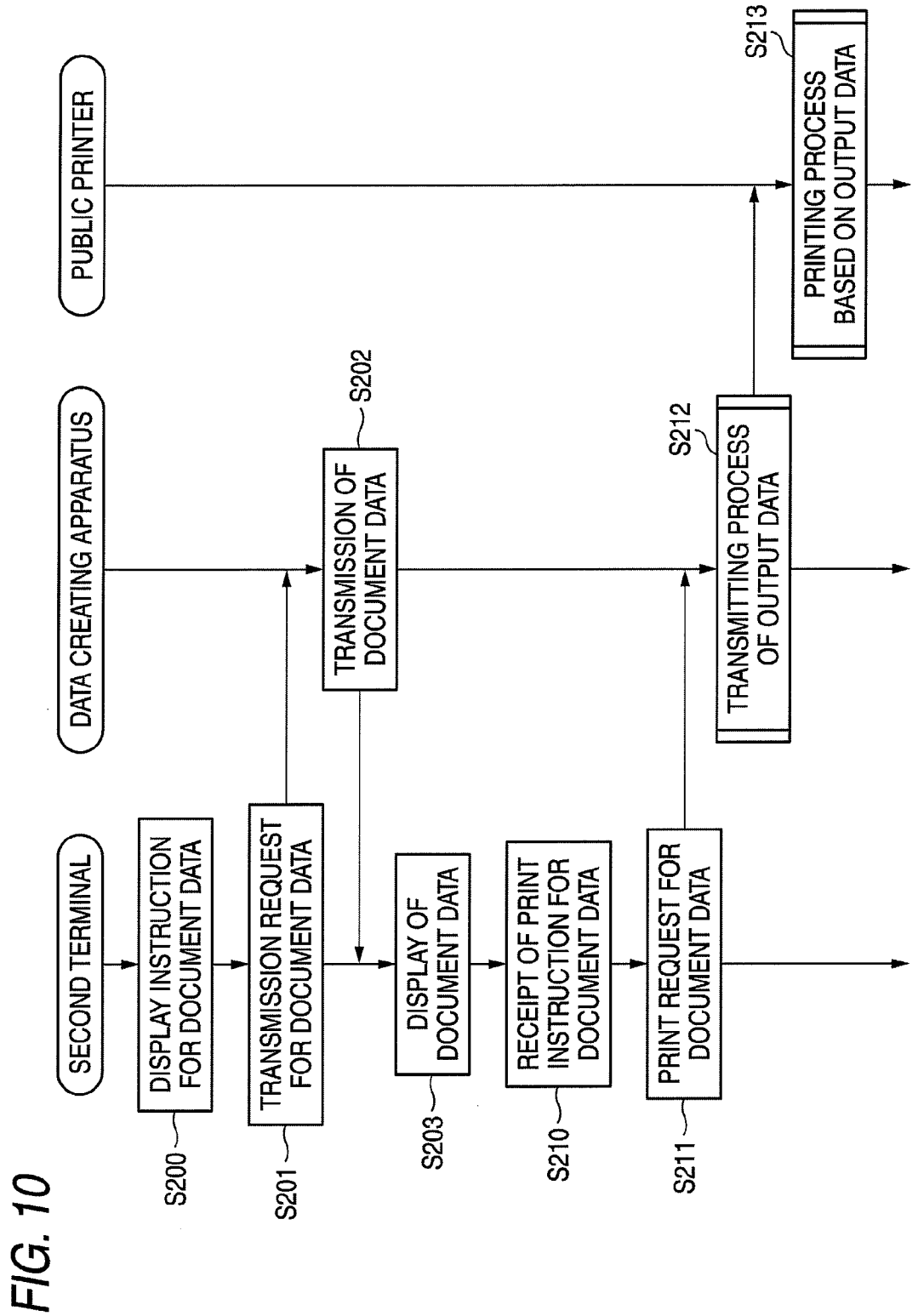
FIG. 10 is a flow chart showing an example of an operation of a displaying process and a printing process of document data.

FIG. 10 is a flow chart showing an example of an operation of a displaying process and a printing process of document data. Upon receiving a display instruction for the document data 13 from a user (S200), the controller 20 of the second terminal 2B starts the application for document data 212 and transmits a transmission request for the document data 13 to the data creating apparatus 4 (S201). Upon receiving the transmission request, the controller 40 of the data creating apparatus 4 transmits the document data 13 stored in the storing unit 41 according to the transmission request (S202).

Next, upon receiving the document data 13, the controller 20 of the second terminal 2B displays a document data display screen on the display unit 23 based on the document data 13 (S203).

Figure 9:
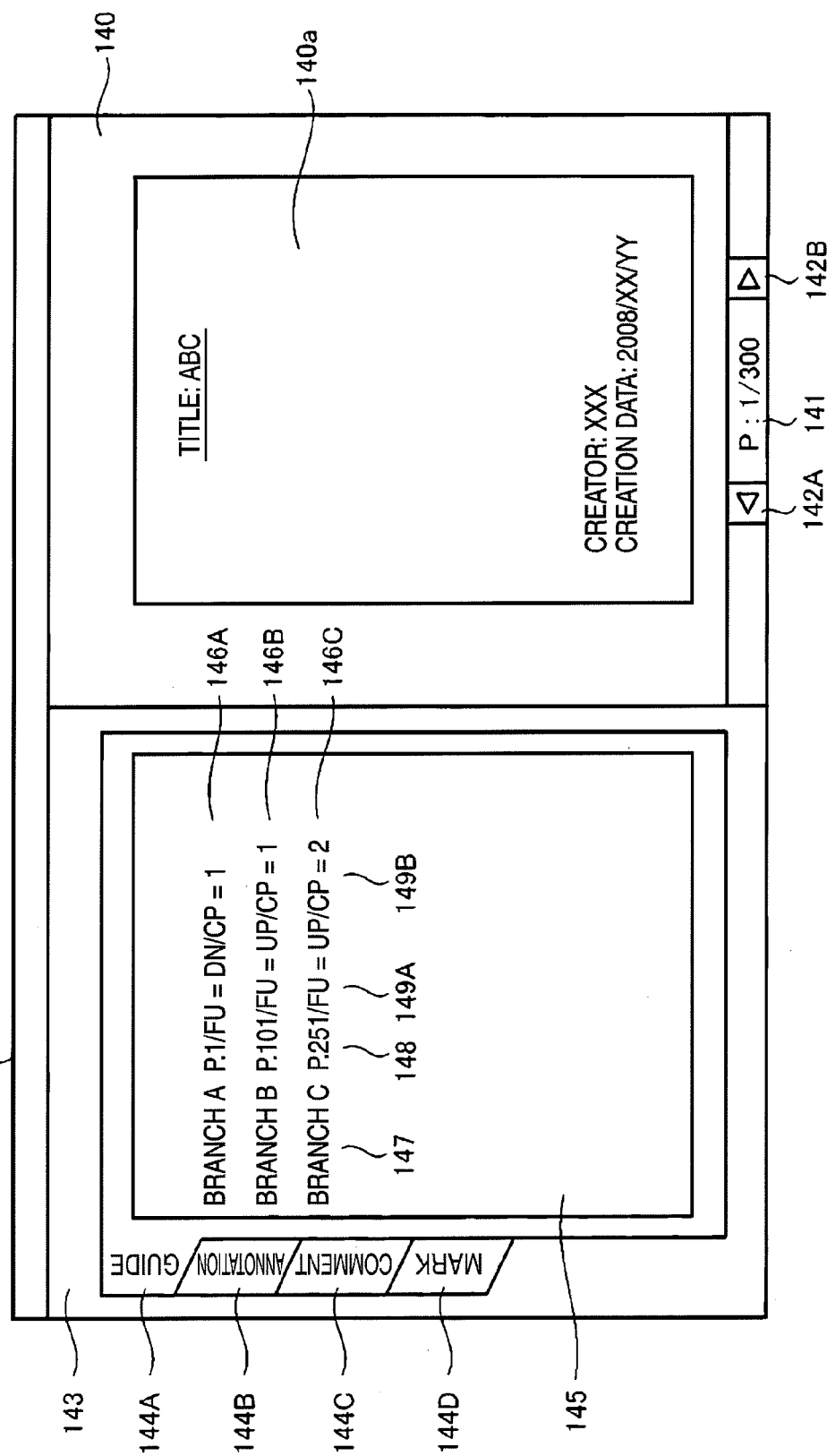
FIG. 9 is a view showing an example of a document data display screen.

FIG. 9 is a view showing an example of a document data display screen. A document data display screen 14 is provided with a window for print-object data 140 which displays data, which are recorded in the print-object data region 130 of document data instructed to be displayed, in the right side of the screen, and a window for print-non-object data 143 which displays data, which are recorded in the print-non-object data region 131, in the left side of the screen.

A document 140a based on the print-object data is displayed in the central portion of the window for print-object data 140. Below the document 140a are provided a page section 141 showing the current page and the total number of pages of the document 140a being currently displayed, a previous page button 142A changing the current page to the previous page of the document 140a, and a next page button 142B changing the current page to the next page of the document 140a.

The window for print-non-object data 143 is provided with tab buttons 144A to 144D corresponding to the guide section 132, the annotation section 133, the comment section 134 and the mark section 135, respectively, and a sub window 145 which displays print control information recorded in a data region selected by the tab buttons 144A to 144D. The example of FIG. 9 shows that the guide section is selected by the tab button 144A.

In the sub window 145, captions 146A to 146C in which the print control information is described in the unit of distribution destination are displayed as a character string. Each of the captions 146A to 146C is a character string including a distribution destination 147 describing the contents of the paragraph information, a paragraph page 148, an output side direction 149A and number of copies 149B describing the contents of the print control information.

For example, the caption 146A shows that a sheet report is inserted by a character string "branch A" of the distribution destination 147 with a branch A as a distribution destination, and the sheet report is inserted by "P.1" of the paragraph page 148 before the first page of the document 140a. In addition, the caption 146A shows that, as print control information when printing prints to be distributed to the branch A, that is, one page to 100 pages of the document 140a, the output side direction (FU) is down (DN) by the character string "FU=DN" of the output side direction 149A and that the number of copies (CP) is one (1) by the character string "CP=2" of the number of copies 149B.

(4) Printing Process of Document Data

Upon receiving a print instruction for the document data 13 from a user through the document data display screen 14 (S210 in FIG. 10), the controller 20 of the second terminal 2B transmits a print request for the document data 13 to the data creating apparatus 4 (S211).

Next, upon receiving the print request, the output unit 402 of the data creating apparatus 4 creates output data based on the document data 13 specified by the data specifying information of the print request and transmits the output data to the public printer 3B specified by printer specifying information (S212). Hereinafter, details of the step S212 will be described with reference to FIG. 11A.

Figure 11A:
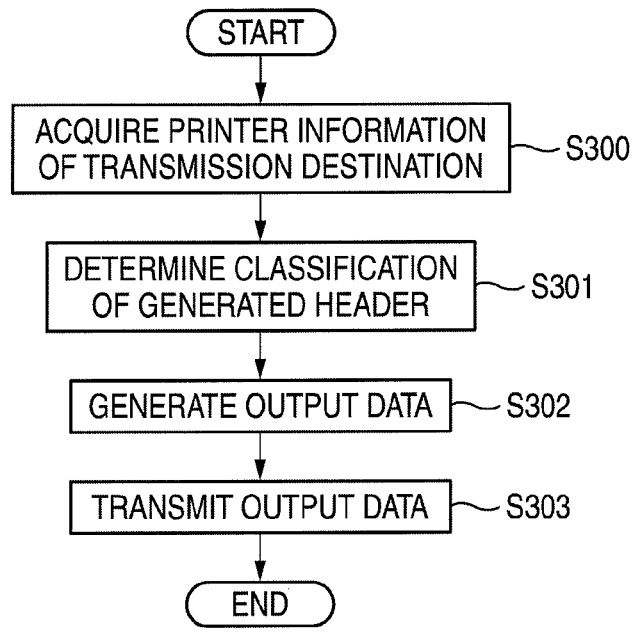
FIG. 11A is a flow chart showing an example of an operation of a transmitting process of output data.

FIG. 11A is a flow chart showing an example of an operation of a transmitting process of the output data. The output unit 402 of the data creating apparatus 4 acquires printer information of a transmission destination of the output data (S300). An example of the printer information may include header classification information indicating a header which can be analyzed by the printer or printer function information indicating the print control information executed by the printer, etc.

Next, the output unit 402 determines the classification of the header given to the output data based on the header classification information of the printer information (S301).

Next, the output unit 402 generates a header including the conversion destination table 411, the form table 412 and so on according to the determined classification and generates output data including the header and the document data 13 (S302). Then, the output unit 402 transmits the output data to the public printer 3B (S303).

Then, in FIG. 10, upon receiving the output data via the communication unit 33, the controller 30 of the public printer 3B causes the expansion processing unit 31B and the printing unit 32 to perform a printing process based on the output data (S213 in FIG. 10). Hereinafter, the details of the step S213 will be described with reference to FIG. 11B.

Figure 11B:
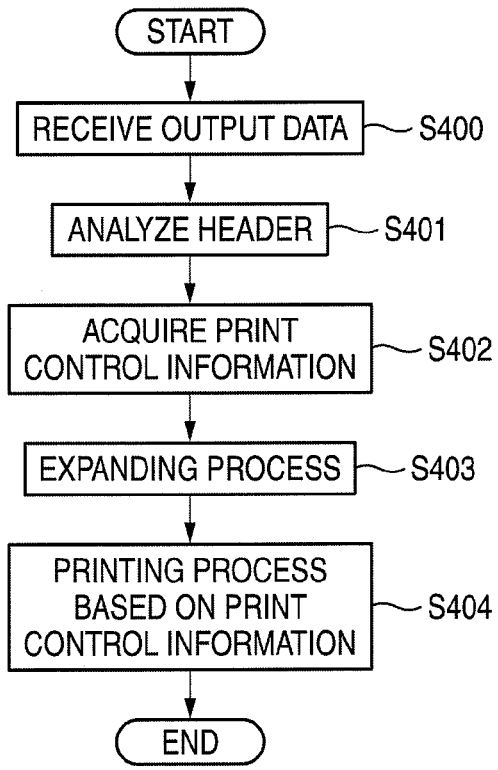
FIG. 11B is a flow chart showing an example of an operation of a printing process based on output data.

FIG. 11B is a flow chart showing an example of an operation of a printing process based on the output data. Upon receiving the output data (S400), the controller 30 of the public printer 3B causes the expansion processing unit 31B to analyze the header included in the output data (S401).

Next, the expansion processing unit 31B acquires the print control information and the paragraph information from the print-non-object data region 131 of the document data 13 included in the output data based on the conversion destination table 411 and the form table 412 acquired as a result of the analysis of the header (S402).

Next, the expansion processing unit 31A performs an expanding process for the data recorded in the display data region 131 of the document data 13 and generates image data (S403).

Then, the printing unit 32 prints the generated image data on a recording medium according to the print control information and the paragraph information and outputs the prints 120 (S404).

In this manner, the data creating apparatus 4 creates the document data 13 from the print job 12 and the second terminal 2B displays and outputs the document data 13. In addition, upon receiving a print instruction for the document data 13, the public printer 3B performs a printing process according to the print control information included in the document data 13. Accordingly, the public printer 3B outputs the same prints as the private printer 3A.

Second Exemplary Embodiment

In the printing system 1A according to the first exemplary embodiment, the data creating apparatus 4 created the document data 13 from the print job. On the other hand, in a printing system 1B according to a second exemplary embodiment, the private printer 3A has a data creating function equipped in the data creating apparatus 4 and creates the document data 13 by converting the print job.

Figure 12:
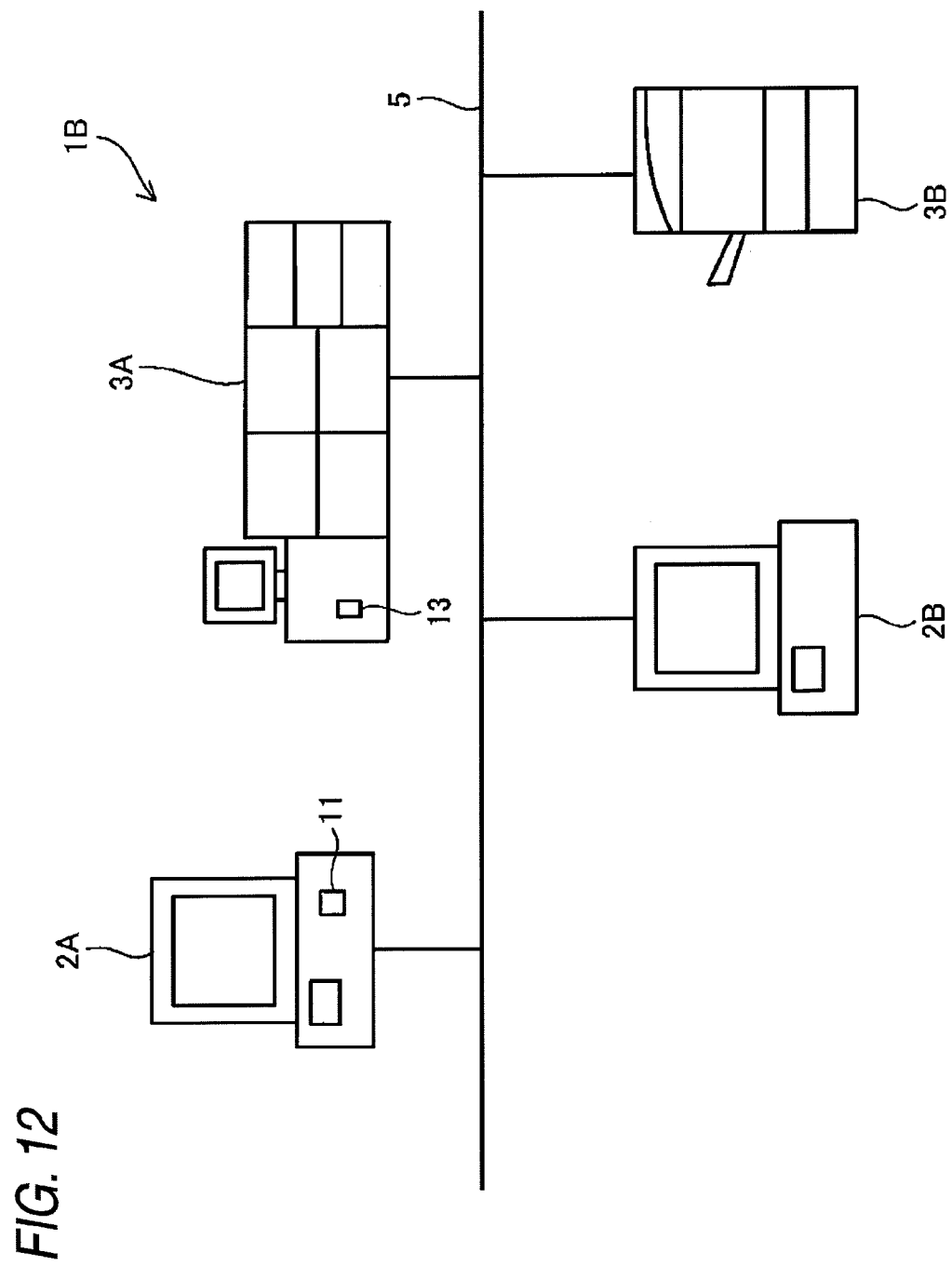
FIG. 12 is a general view showing an example of a general configuration of a printing system according to a second exemplary embodiment of the present invention.

FIG. 12 is a general view showing an example of a general configuration of the printing system according to the second exemplary embodiment of the present invention. The printing system 1B includes a private printer 3A to perform a printing process based on the print job and create the document data 13, in addition to the same first and second terminals 2A and 2B, public printer 3B and network 5 as the first exemplary embodiment.

(Private Printer)

Figure 13:
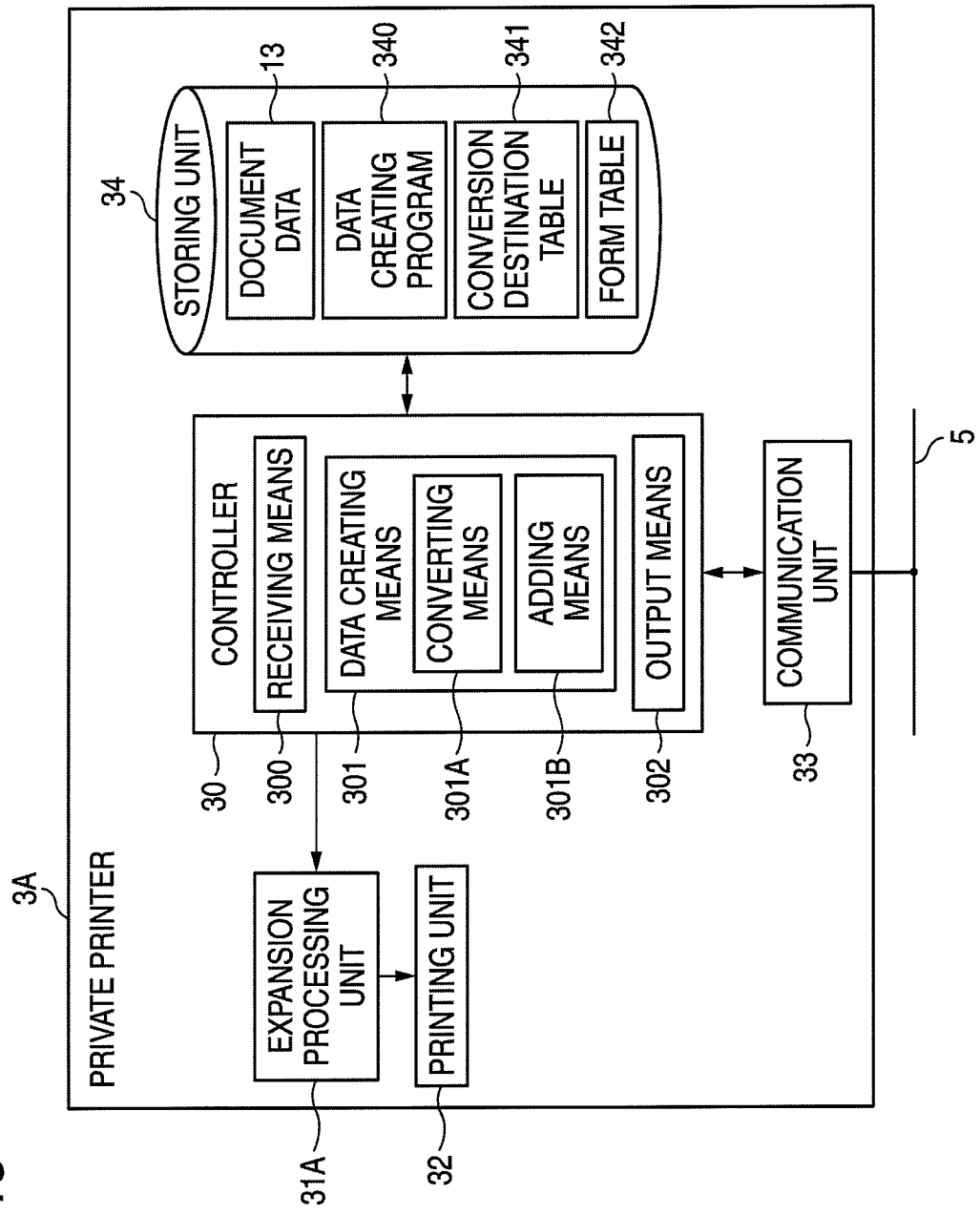
FIG. 13 is a block diagram showing an example of a general configuration of a private printer.

FIG. 13 is a block diagram showing an example of a general configuration of the private printer. The private printer 3A includes a storing unit 34 which stores various kinds of programs and data and is implemented by, for example, ROM, RAM, a hard disk or the like, in addition to the same controller 30, expansion processing unit 31A, printing unit 32 and communication unit 33 as the first exemplary embodiment.

The storing unit 34 stores a data creating program 340, a conversion destination table 341 and a form table 342 and so on in addition to the document data 13. Since the data creating program 340, the conversion destination table 341 and the form table 342 correspond to the data creating program 410, the conversion destination table 411 and the form table 412 according to the first exemplary embodiment, respectively, detailed explanation thereof will not be repeated. In addition, the data creating program 340 may be provided by an information storage medium such as a hard disk, CD-ROM or the like and may be provided via a data communication network such as the Internet or the like.

The controller 30 functions as a receiving unit 300, a data creating unit 301 including a converting unit 301A and an adding unit 301B, an output unit 302 and the like by operating according to the data creating program 340. Since these unit 300 to 302 correspond to the receiving unit 400, the data creating unit 401 and the output unit 402 according to the first exemplary embodiment, respectively, detailed explanation thereof will not be repeated.

Operation of Second Exemplary Embodiment

In the above configuration, when the receiving unit 300 of the private printer 3A receives a print job from the first terminal 2A, the converting unit 301A and the adding unit 301B included in the data creating unit 301 perform a document data creating process based on the print job and create the document data 13 by converting the print job according to the flow chart of FIG. 8. The controller 30 stores the created document data 13 in the storing unit 34. In addition, the expansion processing unit 31A and the printing unit 32 perform a printing process based on the print job and output the prints 120.

Thereafter, upon receiving a display instruction for the document data 13 stored in the private printer 3A, the second terminal 2B performs a displaying process to display the same document data display screen as in FIG. 9.

In addition, upon receiving a print instruction for the document data 13, the second terminal 2B transmits a print request to the private printer 3A. The output unit 302 of the private printer 3A transmits output data to the public printer 3B. Then, the expansion processing unit 31A and the printing unit 32 of the public printer 3B perform a printing process based on the output data and output the same prints 120 as the private printer 3A. In addition, the printing unit 32 of the private printer 3A receiving the print request may perform a printing process without transmitting the output data.

Other Exemplary Embodiments

The present invention is not limited to the above exemplary embodiments but may be modified in various ways without departing from the spirit and scope of the invention. For example, although the receiving unit, the data creating unit and the output unit have been implemented by the controller and the data creating program in the above exemplary embodiment, some or all thereof may be implemented by hardware such as an application specific IC (ASIC) or the like.

In addition, the programs used in the above exemplary embodiments may be read from an information storage medium such as a CD-ROM or the like into a storing unit in the apparatus, or may be downloaded from a sever connected to a network such as the Internet or the like into the storing unit in the apparatus.

In addition, the printing systems in the above exemplary embodiments may have the functions and data of each apparatus as a whole of the printing systems. For example, data such as a conversion destination table, a form table and the like may be stored in other storage devices.

In addition, although the document data created by the data creating apparatus and the data creating unit of the private printer are stored in their own storing units, the document data may be stored in, for example, other storing devices or may be attached to an e-mail and transmitted to the first and second terminals.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A printing system comprising:
a data creating apparatus; and
a printing apparatus that is connected to the data creating apparatus via a network,
wherein the data creating apparatus comprises:
a receiving unit that receives first data described in a print language format for printing;
a converting unit that converts a part of the first data, which corresponds to an electronic document format used for display, received by the receiving unit into second data described in the electronic document format;
an adding unit that adds third data, which does not correspond to the electronic document format, of the first data received by the receiving unit to a file including the second data,
wherein the printing apparatus comprises:
a receiving unit that receives the second data added with the third data transmitted from the data printing apparatus;
an acquiring unit acquires the third data form the second data added with the third data; and
a printing unit that prints on a recording medium, image data corresponding to the second data according to the third data, and
wherein the third data is print control information describing print conditions of the printing apparatus.

2. The printing system according to claim 1, wherein the print control information is information describing processing conditions of the printing apparatus.

3. The printing system according to claim 1, further comprising:
a second printing apparatus,
wherein said second printing apparatus comprises:
a receiving unit that receives the first data; and
a printing unit that prints on a recording medium, image data based on the first data.

4. The printing system according to claim 1, wherein the electronic document format includes a print data region and a display data region, the print data region is configured to be displayed when viewed in a display and printed when an electronic document is printed, and the display data region is configured to be displayed when viewed on a display but not printed with the electronic document is printed, and
wherein the third data is added to the display data region.

5. The printing system according to claim 4, wherein the electronic document format is a portable document format (PDF) and the third data is added to a non-object data region of the PDF.

6. The printing system according to claim 5, wherein the non-object data region includes a plurality of sections, and the third data is added to one of the plurality of sections based on a kind of data that the third data represents.

7. The printing system according to claim 6, wherein when the third data relates to binding a margin the third data is added to an annotation section.

8. The printing system according to claim 6, wherein when the third data designates a sheet tray of the printing system, the third data is added to a comment section.

9. The printing system according to claim 6, wherein when the third data designates an external sheet tray of the printing system, the third data is added to a comment section.

10. The printing system according to claim 1, wherein when the third data includes information indicating insertion of a report sheet, it designates a distribution destination name of a distribution destination.

* * * * *